United States Patent [19]

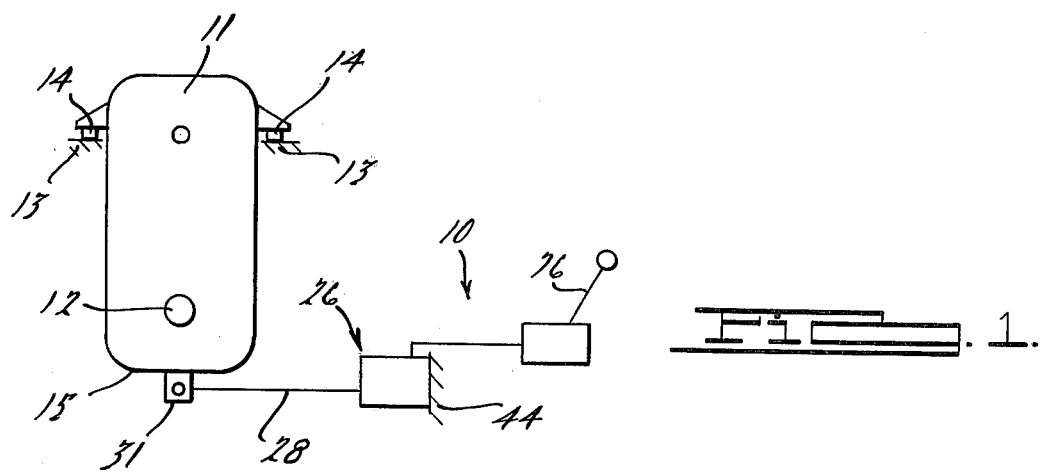

McLean

[11] 4,160,485

[45] Jul. 10, 1979

[54] TRACTOR WITH DRAFT LOAD CONTROL SYSTEM

[75] Inventor: Douglas H. McLean, Grosse Ile, Mich.

[73] Assignee: Ford Motor Company, Dearborn, Mich.

[21] Appl. No.: 864,076

[22] Filed: Dec. 23, 1977

[51] Int. Cl.² .......................................... A01B 63/112
[52] U.S. Cl. ..................................... 172/9; 73/136 R; 172/3
[58] Field of Search .................... 172/2, 3, 7, 8, 9, 10, 172/11, 12; 73/136 R; 74/845, 849, 859, 861, 862

[56] References Cited

U.S. PATENT DOCUMENTS

| 3,164,986 | 1/1965 | Krueger | 73/136 R |
| 3,575,241 | 4/1971 | McKeon et al. | 172/3 |
| 3,686,941 | 8/1972 | Kramasz, Jr. et al. | 73/136 R X |
| 3,732,933 | 5/1973 | Foxwell et al. | 172/7 |
| 3,750,757 | 8/1973 | Saetti | 172/9 |
| 3,753,467 | 8/1973 | Wilson | 172/3 |
| 3,978,718 | 9/1976 | Schorsch | 73/136 R X |

FOREIGN PATENT DOCUMENTS

| 525439 | 10/1976 | U.S.S.R. | 172/3 |

Primary Examiner—Richard T. Stouffer
Attorney, Agent, or Firm—John J. Roethel; Keith L. Zerschling

[57] ABSTRACT

A tractor draft load monitoring system responsive to tractor and associated implement load changes. The system is particularly adapted for a tractor having an engine/transmission power unit coupled to its drive shaft. The power unit is mounted on the frame by resilient mounts that permit measurable angular displacement of the power unit relative to the frame about the drive shaft axis in reaction to changes in the drive shaft torque. The working depth of the implement, which may be tractor mounted, semi-mounted or a pull type implement, is raised or lowered by a hydraulic lift system that is controlled by a control valve assembly connected to a source of fluid under pressure. Interposed between the power unit and the control valve assembly is a transmission cable (Bowden wire type) and lever system that is operative to transmit angular displacement of the power unit to an actuating member of the control valve assembly to cause hydraulic actuation of the hydraulic lift device to change the working depth of the implement to compensate for changes in its draft load.

18 Claims, 3 Drawing Figures

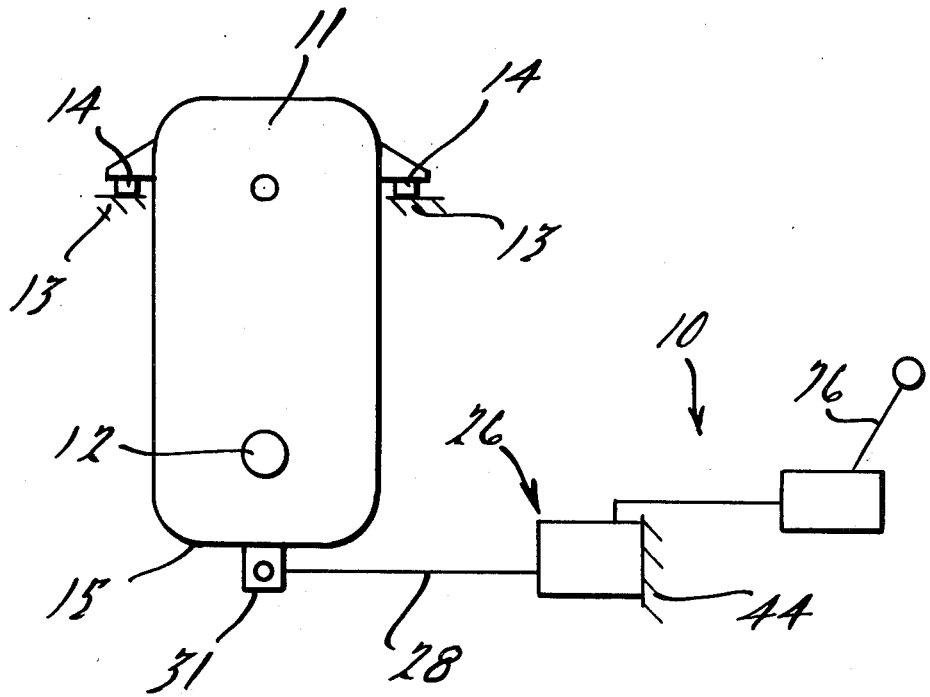

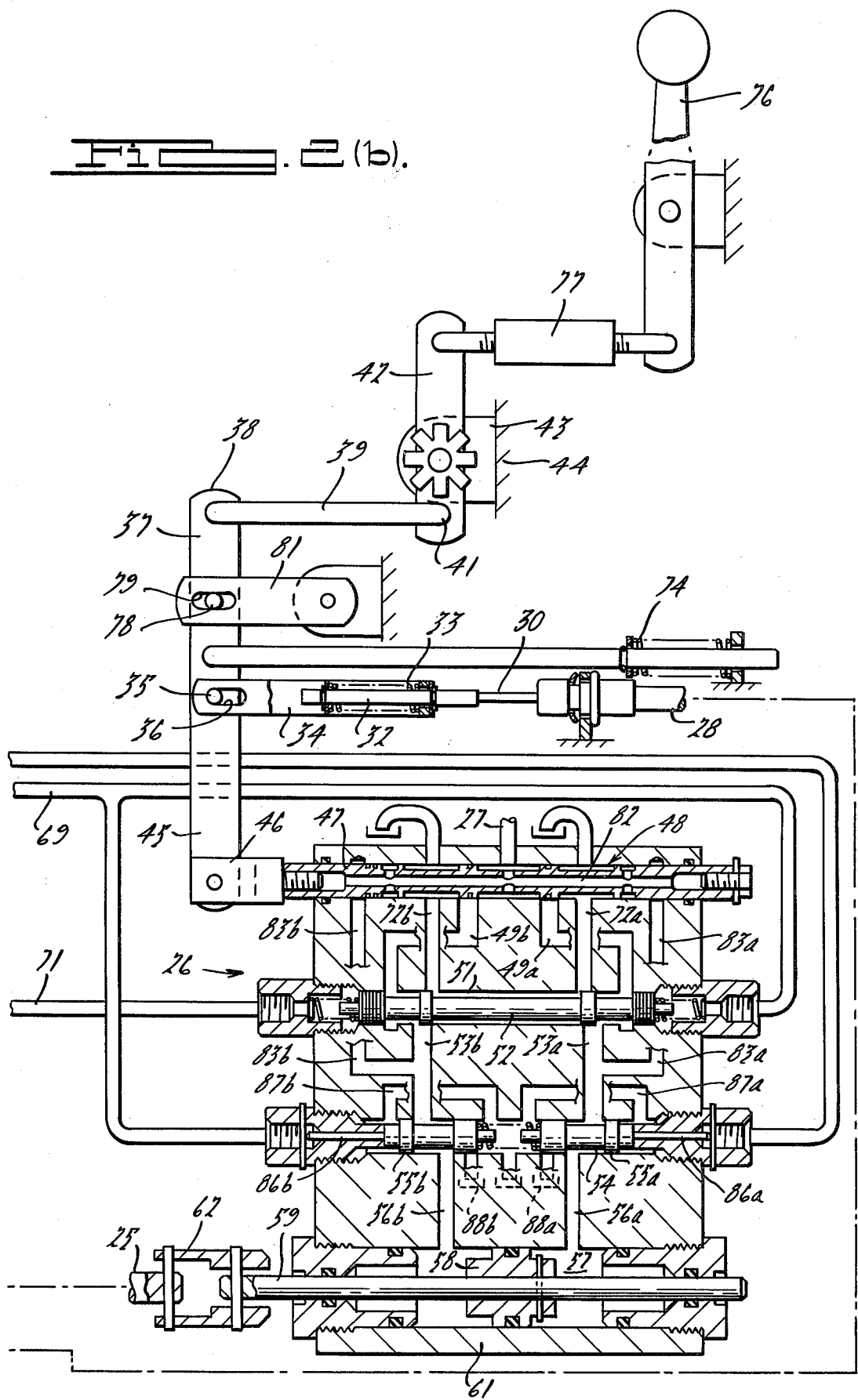

TRACTOR WITH DRAFT LOAD CONTROL SYSTEM

BACKGROUND OF THE INVENTION

U.S. Pat. No. 3,575,241 issued Apr. 20, 1971 to C. E. McKeon et al for a tractor Hydraulic Lift System disclosing a tractor provided with a torque sensing device in the drive line to the tractor driving wheels to control operation of an implement hydraulic lift system for raising and lowering an implement as required to maintain a constant torque on the drive line. The patented system utilizes a torque sensitive coupling in the driveline which through a complex system of links and levers operates a valve means to raise and lower the implement in response to changes in driveline torque resulting from changes in implement draft load.

It is the object of the present invention to provide a load monitoring system that relies more on hydraulics than mechanical elements for sensing torque changes. This has the advantage that a pre-engineered multicomponent valve system replaces a complicated mechanical linkage. It also will be recognized that hydraulic components can be located with considerable flexibility in packaging.

SUMMARY OF THE INVENTION

A tractor draft load monitoring system responsive to tractor and associated implement load changes. The system is particularly adapted for a tractor having an engine/transmission power unit coupled to its drive shaft. The power unit is mounted on the frame by resilient mounts that permit measurable angular displacement of the power unit relative to the frame about the drive shaft axis in reaction to changes in the drive shaft torque. The working depth of the implement, which may be tractor mounted, semi-mounted or a pull type implement, is raised or lowered by a hydraulic lift system that is controlled by a control valve assembly connected to a source of fluid under pressure. Interposed between the power unit and the control valve assembly is a transmission cable (Bowden wire type) and lever system that is operative to transmit angular displacement of the power unit to an actuating member of the control valve assembly to cause hydraulic actuation of the hydraulic lift device to change the working depth of the implement to compensate for changes in its draft load.

DESCRIPTION OF THE DRAWINGS

Further features and advantages of the present invention will be made more apparent as this description proceeds, reference being had to the accompanying drawings, wherein:

FIG. 1 is a schematic of the principal components of the load monitoring system embodying the present invention; and FIGS. 2a and 2b, together, are a detailed schematic of the mechanical hydraulic components of the load monitoring system.

DETAILED DESCRIPTION OF THE INVENTION

FIG. 1 of the drawings represents diagrammatically the relationship of a tractor draft load monitoring system, generally designated 10, to a tractor power unit 11. As exemplified, the tractor power unit 11 is constructed with the engine, transmission and transfer case or drop box as a single unit. The power unit 11 is coupled in a conventional manner to a tractor drive shaft 12. The power unit 11 is mounted to a tractor frame 13 by resilient mounts 14 which permit the power unit to rotate slightly, but measurably, about the longitudinal axis of the drive shaft in reaction to the drive shaft torque. The resilient mounts 14 are located relatively high on the power unit 11 which causes the bottom 15 of the power unit 11 to move sideways or laterally relative to the drive shaft axis when the power unit rotates in reaction to the drive shaft torque. Because this sideways movement is approximately proportional to drive shaft torque, this movement can be used as a measure of implement draft or drawbar pull plus rolling resistance of a tractor when the tractor is coupled to an implement (not shown) in which the implement draft is controlled by a single remote hydraulic lift means for raising and lowering the implement.

The hydraulic lift means comprises a remote hydraulic circuit generally designated 16 (see FIG. 2a) that includes a double acting hydraulic lift cylinder 17, a source of fluid under pressure indicated by an inlet pipe 18 and a supply valve 19 interposed between the source of fluid and the lift cylinder. The supply valve 19 is coupled to the lift cylinder 17 by a first conduit 21 communicating with the head end 22 of the lift cylinder and a second conduit 23 communicating with the rod end 24 of the lift cylinder. The supply valve contains a spool valve 25 which is maintained in a neutral position by a centering spring (not shown) in a conventional manner and when in this position no fluid will flow to the hydraulic lift cylinder 17.

Movement of the spool valve 25 of the supply valve 19 is controlled by a control valve assembly, generally designated 26, that is also connected to a source of fluid under pressure as indicated by an inlet pipe 27 at the top of the control valve assembly, see FIG. 2b. The control valve assembly 26 has several functions, the most important being to sense the sideways movement of the power unit 11 and to transmit that movement to the supply valve 19 to cause the latter to supply fluid to either the head end 22 or the rod end 24 of the lift cylinder 17 to raise or lower the implement as may be required to adjust the draft load on the tractor.

The sideways movement of the power unit 11 is sensed by a flexible transmission cable 28 (of the Bowden cable type) that has its transmission wire or control core 30 coupled at one end 29 (see FIG. 2a) to a retainer 31 secured to the bottom of the power unit 11. The other end 32 of the transmission wire 28 has a spring-loaded connection through spring 33 to a clevis 34 having a pin 35 and slot 36 connection to a summing bar 37 pivoted at its upper end 38 to a link 39 pivotally secured at one end 41 to an arm 42. The arm 42 is pivotally mounted intermediate its ends on a bracket 43 attached to a tractor frame portion 44.

At its lower end 45 of the summing bar 37 is pivotally connected to a clevis 46 coupled to one end of a spool 47 of an input valve 48. The input valve 48 is shown as an integrated part of the control valve assembly 26 and its spool 47 may be considered as the actuator member of the control valve assembly.

To summarize to this point: The power unit 11 is connected through a connecting means, cable 28, to the actuator member or spool 47 of the input valve 48 of the control valve assembly 26. The operation is as follows. First, it is assumed that the tractor is pulling an implement at a steady drawbar pull and that the remote or hydraulic lift cylinder 17 controlling the working depth of the implement is only partially extended from a fully retracted position so that it can move in either direction. Under steady conditions, the input valve spool 47 will be centered as shown in FIG. 2b and no fluid will be flowing into the control valve assembly 26.

If the draft of the implement now increases due to a change in soil conditions, the drive shaft torque will increase and cause the power unit 11 to move about the axis of the drive shaft 12. For purposes of discussion, it will be assumed the motion is clockwise as viewed in FIG. 2a. When this occurs, the bottom of the power unit 11 moves to the left and pulls on the transmission wire 30. The other end 32 of the wire pulls on the summing bar 37 causing it to pivot in a counter-clockwise direction about the link 39, as viewed in FIG. 2b. The movement of the summing bar 37 pushes the input valve spool 47 to the right so that fluid flows from the input conduit 27 to a passage 49a into a bore 51 in the control valve assembly 26. The bore 51 contains a flow control spool 52 that normally is centered, as seen in FIG. 2a. The fluid flows past the centered spool 52 into passage 53a into a bore 54 containing an end of stroke spool 55a which is at its outermost position. The fluid continues to passage 56a into a servovalve cylinder 57 containing a double acting piston 58. The fluid pressure causes the piston 58 to move to the left.

The piston 58 is mounted on a piston rod 59 that extends outwardly of the control valve assembly casing 61. The piston rod 59 and the spool valve 25 are coupled to each other by a coupling 62. Thus, movement of the piston 58 to the left causes corresponding movement of spool valve 25 directing fluid to port 63 of the supply valve 19. Fluid from port 19 flows through conduit 21 to the head end 22 of the lift cylinder 17 causing the latter to extend. The extension of the lift cylinder causes (a) the implement to raise thereby reducing the draft load, and (b) fluid to flow out of the rod end 24 of the lift cylinder through the conduit 23 toward the supply valve outlet port 65.

The conduit 23 contains a check valve 64 having a poppet 66 with an orifice hole 67 in it. At low fluid flow, the oil flows through the orifice 67 causing a pressure drop across the check valve 64. As the flow increases, the pressure drop or pressure differential increases until the pressure entering the check valve 64 is greater than the pressure leaving the check valve plus the force of a check valve spring 68 causing the poppet to open and thereby permitting fluid flow around the latter.

The conduit 23 is tapped above and below the check valve 64 by conduits 69 and 71. Whenever there is fluid flow through the check valve 64, the pressure in conduit 69 is higher than that in conduit 71. This pressure differential acts on the flow control spool 52 causing the latter to move to the left, shutting passage 49a and permitting fluid to flow from passage 53a through passage 72a to a sump 73. Thus, pressure is removed from the servovalve piston 28 permitting the supply valve centering spring to return the supply valve spool 25 to neutral. This cuts off fluid to conduit 21 stopping the operation of the remote cylinder 17.

If the position of the flexible cable wire 30 remains displaced from the original steady state position, the input valve spool 47 will remain displaced to the right, directing fluid into passage 49a. Since the supply valve spool 25 has returned to neutral, pressures in passages 69 and 71 will be equal, allowing the flow control spool 52a to return to center. This permits fluid to flow from passage 49a to passage 53a and to the servovalve piston 51, thereby initiating another implement raise cycle. The load monitor will continue raising the implement in small increments until the position of the flexible cable wire 30 indicates that the desired drawbar pull has been attained.

Now, if soil condition, etc. change to reduce drawbar pull, the load monitor will function in a similar manner but in opposite direction. When the draft is reduced, the power unit 11 rotates counter-clockwise allowing the attached cable 28 to move to the right. When this occurs, the summing bar 37 pivots left about its pivotal connection with upper link 39 pushed by the summing bar preload spring 74. This pulls the input valve spool 47 left, directing fluid from the input conduit 27 to passage 49b, then to 53b and 56b to the servo cylinder 57 moving the servo piston 58 and remote valve spool 25 to the right. This directs fluid from the remote supply to port 65 through the orifice 67 in the check valve poppet 66 and to the head end 24 of the remote cylinder 17. Retracting the piston 75 of remote cylinder 17 will increase the draft of the implement. As the fluid goes through the orifice 66 in the check valve 64, there will be a pressure drop and the pressure in passage 71 will be higher than in passage 69. This causes the flow control valve spool 52 to move to the right closing off passage 49b and allowing the remote valve spool centering spring to center the spool 25 and shut, thus to stop the motion of the remote cylinder. This cycle will repeat until the position of the flexible cable 28 indicates that the desired drawbar pull has been reached.

When the operator desires to operate at a different value of drawbar pull, he has to change the position of a control lever 76. Assume that a reduction in drawbar pull is desired. Moving the upper end of the control lever 76 (shown in FIG. 2b) to the left will, through an adjustable link 77, move the upper end 38 of the summing bar 37 to the left. As the upper end 38 moves left, the bar 37 pivots about the cable clevis 34 and its lower end 45 moves to the right pushing the input valve spool 47 to the right. This directs fluid to passage 49a then to 53a and 56a moving the servo piston 58 and remote valve spool 25 to the left. Thus, fluid from the remote supply is directed to port 63 which extends the remote cylinder and raises the implement reducing drawbar pull. Fluid passing through the check valve 64 orifice 67 causes the pressure in passage 69 to be higher than in passage 71 moving the flow control spool 52 to the left stopping the motion of the remote cylinder. As a result of the reduction in drawbar pull, the cable clevis 34 moves to the left moving the input valve spool 47 to the left towards the center position. If the drawbar pull reduction is sufficient, the input valve spool will be centered and no further load monitor action will occur. If the drawbar pull is still too high, the cycle will repeat until the desired drawbar pull level is reached.

When an increase in drawbar pull is desired, the operator moves the control lever to the right. The load monitor system responds as above except in the opposite direction.

A fast raise/fast lower mode is provided when the remote cylinder 17 is to be moved to fully extended or fully retracted position unhampered by the flow control cycling. For fast raise (lift cylinder extend) mode, the operator moves the control lever 76 to the left extreme of its travel. This moves the top of the summing bar 37 to the left first pivoting the summing bar about the pin 78 of the clevis 34. When a pin 78 through the summing bar 37 and through a slotted hole 79 in link 81 reaches the left end of its travel, the summing bar 37 then pivots about this pin 78. This compresses the preload spring 74, releases the load on clevis 34, and pushes the input valve spool 47 to its extreme right position. Then the input fluid flows through the center axial hole 82 in the input spool 47 and to passage 83a. Passage 83a bypasses the flow control spool 52 and the fluid flows directly to passage 53a. Thus, in fast raise/fast lower mode, movement of the flow control spool 52 will not affect the fluid flow within the servovalve 51. The fluid from 53a flows through the end of stroke bore 54 and through passage 56a causing fluid to be directed to the servovalve piston 58. Remote supply valve 19 fluid is then directed to port 63 and the remote cylinder extends.

When the cylinder 17 reaches the end of its travel, the pressure rises in the line 21 between port 63 and the remote cylinder 17 and this pressure is transmitted by line 84 to the servovalve 51. When the pressure (limited by a supply valve pressure relief valve 85) acts on a pin 86a, the pin 86a pushes the right hand spool 55a to the left. This shuts off passage 53a, shuts off the left end of passage 87a, and opens passage 56a to sump 88a. The centering spring in the supply valve returns the supply valve spool 25 to neutral position and the remote cylinder 17 is held in its extended position. The pressure from passage 53a acts on the right end of the right hand spool 55a and keeps it in its extreme left position until the input valve spool 47 is centered again.

For fast lower mode, the control lever is moved to the extreme right position. The system then functions similar to the fast raise mode except in the opposite direction with the control valve assembly components marked with the postscript "b" being involved. Similarly, when the cylinder 17 reaches the end of its travel, the pressure build up in line 69 and its branch 69a causes the pin 86b to push the left hand spool 55b to the left. This shuts off passage 53b, shuts off the left end of passage 87b, and opens passage 56b to sump 88b. The supply valve centering spring returns the supply valve spool 25 to a neutral position and the remote cylinder is held in its retracted position. The pressure from passage or conduit 53b acts on the left end of the left end spool 55b and keeps it in its extreme right position until the input valve spool 47 is centered again.

It is to be understood this invention is not limited to the exact construction illustrated and described above, but that various changes and modifications may be made without departing from the spirit and scope of the invention as defined by the following claims.

I claim:

1. In a tractor having an engine and transmission power unit coupled to a drive shaft, resilient mounts mounting the power unit on a frame of the tractor, the resilient mounts permitting measurable angular displacement of the power unit relative to the frame about the drive shaft axis in reaction to changes in the drive shaft torque, the resilient mounts being located relatively high on the power unit thereby to increase the degree of lateral movement of the bottom of the power unit, the lateral movement being approximately proportional to the drive shaft torque, hydraulic lift means for raising and lowering an earth working implement coupled to the tractor, a control valve assembly connected to a source of fluid under pressure, and connecting means interposed between the power unit and the control valve assembly operative to transmit angular displacement of the power unit to an actuating member of the control valve assembly to cause hydraulic actuation of the hydraulic lift means to change the working depth of the implement to compensate for changes in draft load, the connecting means being connected to the bottom of the power unit.

2. In a tractor according to claim 1, in which:

the hydraulic lift means comprises a remote hydraulic circuit including a hydraulic lift cylinder, a source of fluid under pressure, and a supply valve interposed between the source of fluid and the lift cylinder, the supply valve being coupled to the lift cylinder by conduits communicating with the head and rod ends of the lift cylinder, respectively, the supply valve having a spool valve shiftable by the control valve assembly in response to actuation of the latter by the connecting means.

3. In a tractor according to claim 2, in which:

the control valve assembly actuating member comprises an input valve having a spool shiftable by the connecting means from a neutral position in one or the other of two directions, the input valve spool having a plurality of conduits communicating with a servovalve having double action piston means coupled to the spool valve of the supply valve, the input valve spool upon being shifted in the one direction from its neutral position directing fluid through conduits communicating with the servovalve piston to cause the latter to move the spool valve of the supply valve in a direction to cause the hydraulic lift means to raise the implement, and the input valve spool upon being shifted in the other direction, directing fluid to the servovalve piston to cause the latter to move the spool valve of the supply valve in a direction to cause the hydraulic lift means to lower the implement.

4. In a tractor according to claim 3, in which:

the remote hydraulic circuit of the hydraulic lift means has a check valve in the conduit communicating with the rod end of the lift cylinder, the check valve comprising a spring-loaded poppet having a metering orifice therethrough, the metering orifice creating a pressure differential across the check valve in closed position of the poppet until the pressure in the conduit overcomes the spring load on the poppet to permit flow around the latter, and a flow control valve responsive to a predetermined pressure differential across the check valve to shut off the flow of fluid from the input valve to the servovalve.

5. In a tractor according to claim 4, in which:

the servovalve includes an end of stroke valve means responsive to increased pressure in the conduit carrying fluid to the hydraulic lift cylinder as the latter reaches the end of a raising or lowering stroke to (1) cut off fluid to the servovalve piston, (2) to permit discharge of fluid exerting pressure on the piston to a sump and to permit restoration of the piston to a neutral position by a centering spring.

6. In a tractor according to claim 5, in which:
the connecting means comprises a flexible cable means attached at one end to the power unit and at its opposite end to a lever means coupled to the control valve assembly actuating member.

7. In a tractor according to claim 6, in which:
the lever means operable by the flexible cable means is coupled to a manual operating means capable of shifting the input valve spool independently of the flexible cable means thereby to cause raising or lowering of the implement.

8. In a tractor according to claim 7, in which:
movement of the manual operating means to an extreme implement raising or lowering position shifts the input valve spool to a position in which fluid flow is directed through a bypass conduit around the flow control valve so that movement of the latter will have no effect on the operation of the servovalve,
the fluid flow bypassing the control flow valve causing rapid raising or lowering of the implement in a direction corresponding to the direction of movement of the manual control lever.

9. In a tractor having an engine and transmission power unit coupled to a drive shaft,
resilient mounts mounting the power unit on a frame of the tractor,
the resilient mounts permitting measurable angular displacement of the power unit relative to the frame about the drive shaft axis in reaction to changes in the drive shaft torque,
hydraulic lift means for raising and lowering an earth working implement coupled to the tractor,
a control valve assembly connected to a source of fluid under pressure,
and connecting means interposed between the power unit and the control valve assembly operative to transmit angular displacement of the power unit to an actuating member of the control valve assembly to cause hydraulic actuation of the hydraulic lift means to change the working depth of the implement to compensate for changes in draft load,
the connecting means comprising a flexible cable means attached at one end to the power unit and at its opposite end to a lever means coupled to the control valve assembly actuating member,
the hydraulic lift means comprising a remote hydraulic circuit including a hydraulic lift cylinder,
a source of fluid under pressure,
and a supply valve interposed between the source of fluid and the lift cylinder,
the supply valve being coupled to the lift cylinder by conduits communicating with the head and rod ends of the lift cylinder, respectively,
the supply valve having a spool valve shiftable by the control valve assembly in response to actuation of the latter by the connecting means,
the control valve assembly actuating member comprising an input valve having a spool shiftable by the connecting means from a neutral position in one or the other of two directions,
the input valve spool having a plurality of conduits communicating with a servo valve having double action piston means coupled to the spool valve of the supply valve,
the input valve spool upon being shifted in the one direction from its neutral position directing fluid through conduits communicating with the servovalve piston to cause the latter to move the spool valve of the supply valve in a direction to cause the hydraulic lift means to raise the implement,
and the input valve spool upon being shifted in the other direction, directing fluid to the servovalve piston to cause the latter to move the spool valve of the supply valve in a direction to cause the hydraulic lift means to lower the implement.

10. In a tractor according to claim 9, in which:
the remote hydraulic circuit of the hydraulic lift means has a check valve in the conduit communicating with the rod end of the lift cylinder,
the check valve comprising a spring-loaded poppet having a metering orifice therethrough,
the metering orifice creating a pressure differential across the check valve in closed position of the poppet until the pressure in the conduit overcomes the spring load on the poppet to permit flow around the latter,
and a flow control valve responsive to a predetermined pressure differential across the check valve to shut off the flow of fluid from the input valve to the servovalve.

11. In a tractor according to claim 10, in which:
the servovalve includes an end of stroke valve means responsive to increased pressure in the conduit carrying fluid to the hydraulic lift cylinder as the latter reaches the end of a raising or lowering stroke to (1) cut off fluid to the servovalve piston, (2) to permit discharge of fluid exerting pressure on the piston to a sump and to permit restoration of the piston to a neutral position by a centering spring.

12. In a tractor according to claim 11, in which:
the lever means operable by the flexible cable means is coupled to a manual operating means capable of shifting the input valve spool independently of the flexible cable means thereby to cause raising or lowering of the implement.

13. In a tractor according to claim 12, in which:
movement of the manual operating means to an extreme implement raising or lowering position shifts the input valve spool to a position in which fluid flow is directed through a bypass conduit around the flow control valve so that movement of the latter will have no effect on the operation of the servovalve,
the fluid flow bypassing the control flow valve causing rapid raising or lowering of the implement in a direction corresponding to the direction of movement of the manual control lever.

14. In a tractor having an engine and transmission power unit coupled to its drive shaft,
resilient means mounting the power unit on a frame of the tractor,
the resilient mounts permitting measurable angular displacement of the power unit relative to the frame about the drive shaft axis in reaction to changes in the drive shaft torque,
hydraulic lift means for raising and lowering an implement coupled to the tractor,
a control valve assembly connected to a source of fluid under pressure,
the control valve assembly having a fluid flow actuating member and a flow control valve controlling fluid flow from the source to a servovalve for operating a fluid supply valve supplying fluid to a hydraulic lift cylinder of the hydraulic lift means, and connecting means interposed between the power unit and the control valve assembly operative to transmit angular displacement of the power unit to the actuating member of the control valve assembly to cause hydraulic actuation of the hydraulic lift means to change the working depth of the implement to compensate for changes in draft load, the hydraulic lift means for raising and lowering the implement including a conduit having a pressure differential establishing valve, the pressure differential being sensed by the flow control valve causing the latter to intermittently interrupt fluid flow to the servovalve until the pressure differential is equalized whereupon the cycle is repeated if the connecting means continues to signal angular displacement of the power unit, the raising or lowering movement of the implement continuing in small increments until the connecting means indicates the desired draft load has been attained.

15. In a tractor according to claim 14, in which:

the connecting means comprises a flexible cable means attached at one end to the power unit and at its opposite end to a lever means coupled to the control valve assembly actuating member.

16. In a tractor according to claim 15, in which:

the lever means operable by the flexible cable means is coupled to a manual operating means capable of operating the control valve assembly actuating member independently of the flexible cable means thereby to cause raising or lowering of the implement by direct operation of the servovalve.

17. In a tractor according to claim 16, in which:

movement of the manual operating means to an extreme implement raising or lowering position causes fluid flow to bypass the flow control valve in the control valve assembly thereby nullifying any effect the flow control valve has on the operation of the servovalve.

18. In a tractor having an engine and transmission power unit coupled to a drive shaft, resilient mounts mounting the power unit on a frame of the tractor, the resilient mounts permitting measurable angular displacement of the power unit relative to the frame about the drive shaft axis in reaction to changes in the drive shaft torque, hydraulic lift means for raising and lowering an earth working implement coupled to the tractor, a control valve assembly connected to a source of fluid under pressure, and connecting means interposed between the power unit and the control valve assembly operative to transmit angular displacement of the power unit to an actuating member of the control valve assembly to cause hydraulic actuation of the hydraulic lift means to change the working depth of the implement to compensate for changes in draft load, the connecting means comprising a flexible cable means attached at one end to the power unit and at its opposite end to a lever means coupled to the control valve assembly actuating member, the lever means operable by the flexible cable means being coupled to a manual operating means capable of operating the control valve assembly actuating member independently of the flexible cable means thereby to cause raising or lowering of the implement by direct operation of the servovalve, movement of the manual operating means to an extreme implement raising or lowering position causing fluid flow to bypass the control valve assembly thereby nullifying any effect the latter has on the operation of the servovalve.

* * * * *